United States Patent [19]
Göckler et al.

[11] 4,389,616
[45] Jun. 21, 1983

[54] METHOD AND ARRANGEMENT FOR THE DIGITAL REGULATION OF THE CARRIER PHASE ERROR IN RECEIVERS OF DATA TRANSMISSION SYSTEMS

[75] Inventors: Heinz Göckler, Backnang; Hagen Hofmeister, Korb, both of Fed. Rep. of Germany

[73] Assignee: Aeg-Telefunken AG Licentia Patent-Verwaltungs-GmbH, Frankfurt am Main, Fed. Rep. of Germany

[21] Appl. No.: 217,519

[22] Filed: Dec. 15, 1980

[30] Foreign Application Priority Data

Dec. 14, 1979 [DE]   Fed. Rep. of Germany ....... 2950339

[51] Int. Cl.³ ........................................... H04L 27/22
[52] U.S. Cl. .................................... 329/104; 329/107; 329/110; 375/83; 375/99
[58] Field of Search ................. 329/50, 104, 105, 107, 329/110, 122; 375/99, 111, 118, 119, 106, 83–87

[56] References Cited

PUBLICATIONS

Freeny, "Special-Purpose Hardware for Digital Filtering", Proceedings of the IEEE, vol. 63, Apr. 1975, pp. 633–648.
Göckler et al, "Datenübertragung mit 4.8 Kbits/s im Fernsprechnetz", Wissenschaftliche Berichte AEG-Telefunken, vol. 51, 1978, pp. 231–245.
George et al, "An Adaptive Decision Feedback Equalizer", IEEE Transactions on Communication Technology, vol. COM-19, Jun. 1971, pp. 281–293.
Maddens, "Carrier-Phase Tracking in Synchronous Data Transmission Systems", IBM Technical Disclosure Bulletin, vol. 19, Oct. 1976, pp. 1729–1732.
Kammeyer et al, "Ein Flexibles Experimentiersystem für die Datenübertragung im Fernsprechbereich (Teil I)", Frequenz, vol. 33, No. 5, 1979, pp. 141–145.
Kammeyer et al, "Ein Flexibles Experimentiersystem für die Datenübertragung im Fernsprechbereich (Teil II)", Frequenz, vol. 33, No. 6, 1979, pp. 165–172.
"Microprocessor Implementation of High-Speed Data Modems", Van Gerwen et al, IEEE Transactions on Communications, vol. COM-25, No. 2, Feb. 1977, pp. 238–250.
"A High Performance Digital QAM 9600 bit/s Modem", Akashi et al, NEC Research & Development, No. 45, Apr. 1977, pp. 38–49.

*Primary Examiner*—Siegfried H. Grimm
*Attorney, Agent, or Firm*—Spencer & Kaye

[57] ABSTRACT

A method for digitally regulating the residual carrier phase error in receivers of digital data transmission systems. A comparator compares the sampled data signal or value of the carrier demodulated input signal to the receiver with the estimated value for each associated sampling time or moment as provided by a decider, to determine the deviation dk which is a measure for the phase difference between the sampled value and the associated estimated value. This deviation dk is filtered in a digital loop filter, including a proportional branch and an integration branch, and a regulating value for the demodulated input signal is obtained from a subsequently connected accumulator. A non-linear limitation on the deviation dk is included in the integration branch of the digital loop filter.

9 Claims, 2 Drawing Figures

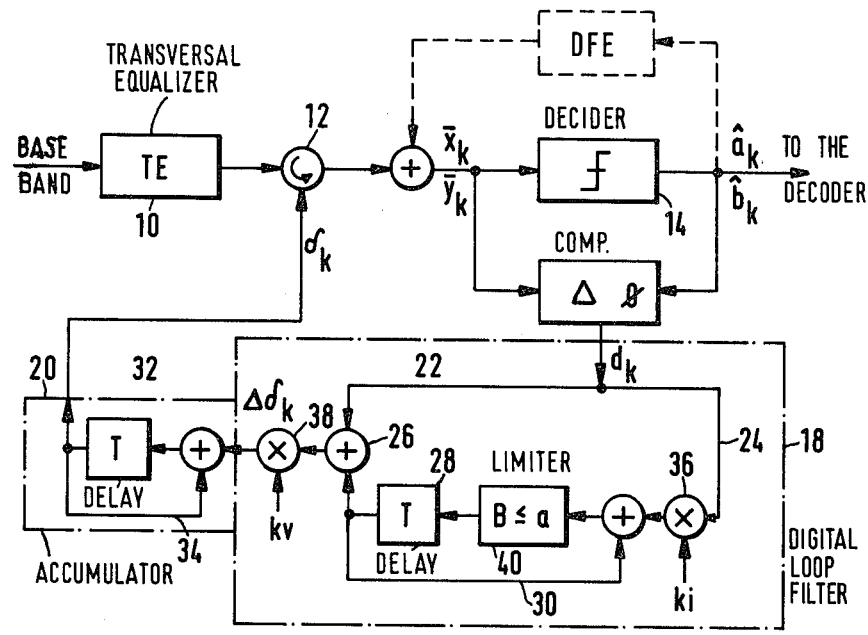
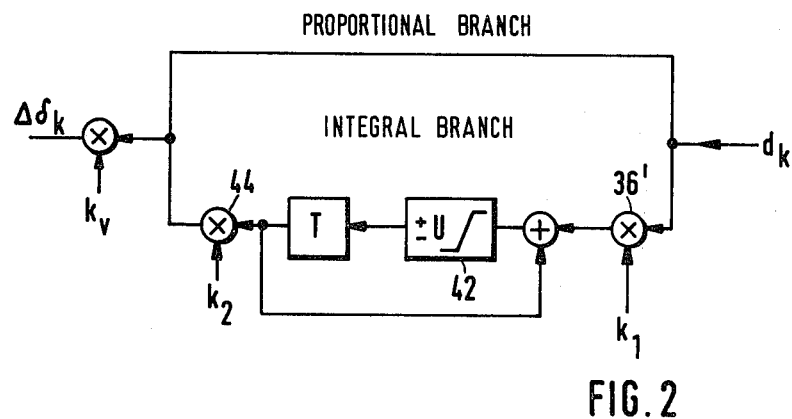
FIG.1
FIG.2

METHOD AND ARRANGEMENT FOR THE DIGITAL REGULATION OF THE CARRIER PHASE ERROR IN RECEIVERS OF DATA TRANSMISSION SYSTEMS

BACKGROUND OF THE INVENTION

The present invention relates to a method and a circuit arrangement, respectively, for digitally regulating the carrier phase error in receivers of digital data transmission systems of the type wherein a comparator is used to determine, from the sampled value of the demodulated input signal and from the estimated value for each sampling time associated therewith by means of a decider, the deviation dk which is a measure for the phase difference between the sampled value and the estimated value. This deviation value is then filtered in a digital loop filter, including a proportional branch and an integration branch, and the regulating value is obtained in a subsequently connected accumulator.

Such a method and circuit arrangements for practicing the method are disclosed in the paper by Kammeyer and Schenk, "Ein Flexibles Experimentier-system für die Datenübertragung im Fernsprechbereich" (A Flexible Experimental System for Data Transmission in the Telephone Field), FREQUENZ (Frequency), 1979, Volume 33, No. 5, pages 141-145 and No. 6, pages 165-172 as well as in an article by Göckler, Hofmeister and Till "Datenübertragung mit 4.8 kBit/s im Fernsprechnetz" (Data Transmission with 4.8 kBit/s in a Telephone Network) WISSENSCHAFTLICHE BERICHTE (Scientific Reports) AEG-TELEFUNKEN, 1978, Vol. 51, No. 4/5. pages 231-245. In this described system, the phase information for the carrier regulation is derived from the input and output signals of the decider. The decider input signal can be represented in the signal plane by a vector which for quadrature amplitude modulation (QAM) includes the components $\tilde{x}k$ and $\tilde{y}k$, these components being sampled values of the analytical signal after demodulation. In the decider, these sampled values are associated with estimated values $\hat{a}k$, $\hat{b}k$. The average of the phase difference between the actual value vector and the desired value vector corresponds to the carrier phase error. By means of the carrier phase error regulation, the demodulation phase is caused to be regulated until the phase difference on the average becomes zero. For this purpose, a deviation dk is determined in a comparator for each sampling time k·T as it results from the corresponding linkage of the input and output signals of the decider. After filtering of the deviation value dk in a digital loop filter with subsequent accumulation, there results the angle of additional rotation of the signal vector as required for coherent demodulation. The digital loop filter includes a proportional branch and an integration branch. Both branches of the filter can be weighted by means of respective multipliers or multiplying values ki or kv, respectively. However, even with favorable dimensioning of these two weighting factors it is possible that in the nontransient final state other parameter settings occur which are of similar quality criteria but are otherwise unusable.

SUMMARY OF THE INVENTION

It is therefore the object of the present invention to provide a method, and a circuit arrangement for practicing this method, which makes it possible to realize an optimum setting of the parameters with mutually coupled adaptive adjustment of the adaptive equalizer and the digital phase regulation so that correct data transmission is possible in the nontransient final state. In this connection it should be avoided that other parameter settings occur which are similar with respect to the quality criteria but are otherwise unusable.

The above object is achieved according to the invention in that, in a method for digitally regulating carrier phase error in receivers of digital data transmission systems including the steps of feeding the sampled values of the demodulated input signal of the receiver to a decider to provide estimated values for each associated sampling time, comparing the sampled value of the demodulated input signal with the associated estimated value for each sampling time to determine a deviation value which is a measure for the phase difference between the sampled value and the associated estimated value, filtering the deviation value in a digital loop filter including parallelly connected proportional and integral circuit branches, accumulating the output values of the digital loop filter to provide a regulating value, and using this regulating value to correct the carrier error, a non-linear limit on the deviation value being integrated over time is included in the integral branch of the digital loop filter.

Preferably, the deviation value being integrated in the integration branch of the digital loop filter is limited to a value equal to or less than one half of the angular spacing between the desired phase positions of the carrier. Moreover, the non-linear limitation of the deviation value is preferably only utilized after the end of a data transmission preamble.

According to the apparatus of the invention, the above object is achieved by inserting a non-linear limiter in the integration branch of the digital loop filter to limit the deviation value being integrated to a desired maximum value.

BRIEF DESCRIPTION OF THE DRAWINGS

FIG. 1 is a block circuit diagram of an embodiment of an apparatus according to the invention for carrying out the method of the invention.

FIG. 2 is a block circuit diagram showing a modification of the embodiment of FIG. 1.

DETAILED DESCRIPTION OF THE PREFERRED EMBODIMENTS

Referring now to FIG. 1, there is shown an example for an embodiment of a carrier regulation circuit for an mPSK (phase shift keying) system where m is the number of phase positions. As shown, the demodulated base band signal, which has been equalized in a transversal equalizer 10, is fed to a unit 12 wherein it is, e.g. with the aid of a Cordic algorithm, shifted into the desired phase position by means of a generated regulating value δk. This algorithm is, for instance, described by J. E. Volder "The CORDIC trigonometric computing technique", IRE Trans. Electron. Comput. Vol EC-8, pp. 330-334, Sept. 1959. The sampled regulated output signal value from the unit 12, which signal value with quadrature amplitude modulation (QAM) includes the components $\tilde{x}k$ and $\tilde{y}k$, is fed to a decider 14 in which the estimated values, e.g. $\hat{a}k$ and $\hat{b}k$, respectively, are associated with the sampled signal values. The estimated output signal values from the decider 14 are fed to a decoder (not shown) for the receiver.

Various deciders are described by Bennett and Davey "Data Transmission" McGraw-Hill Book Company 1965, pages 201–208.

In order to generate the regulating signal $\delta k$, the phase difference $\Delta\Phi$ between the estimated value and the sampled value is determined by feeding the input and output signals of the decider 14 to a comparator 16, which produces a deviation signal dk corresponding to the phase difference. This deviation dk is filtered in a digital loop filter 18 and is accumulated in a subsequently connected accumulator 20 to form the regulating value $\delta k$. The digital loop filter 18 comprises the parallel connection of a proportional circuit branch 22 and an integrating circuit branch 24, with the outputs of the two branches being summed in a summing unit 26. The integrating circuit branch 24 includes a delay member 28 provided with a feedback connection 30. The accumulator 20 is likewise provided with a delay member 32 with a feedback connection 34. The integrating branch 24 of the digital loop filter 18 is provided with a multiplier circuit 36 so that the value of dk therein can be weighted with the multiplier value ki, and the output of the summing circuit 26 is provided with a further multiplier circuit 38 so that the values resulting from both branches 22 and 24 can be weighted with a multiplier kv to provide the values $\Delta\delta k$ which are accumulated in accumulator 20.

According to the invention, the integral or integration branch 24 of the digital loop filter 18 further includes a non-linear limiter 40 with which the change in the regulating value $\delta k$ is limited to a maximum amount per stepping clock pulse, so that unusable parameter settings are avoided. The limiter 40 produces an output signal B such that all output values B of the integration branch greater than a, i.e. $|B|>a$, are limited so that $|B|\leq a$, where $a=360°/2m$ and m is the number of desired phase positions for the PSK system.

The invention can of course also be used in receivers having a decision feedback connected equalizer DFE or operating according to any other equalizing principles. A type of decision feedback equalizer is described, e.g. by George, Bowen and Storey, "An adaptive decision feedback equalizer", IEEE Trans. Communic. vol. COM-19 (1971) 3, pages 281–293. The basic regulating circuit arrangement shown in FIG. 1, is described by Maddens, "Carrier-Phase tracking in Synchronous Data Transmission Systems" IBM Techn. Disclosure Bull. vol. 19 (1976) 5 pages 1729–1732. A limiter which can be used for the limiter 40 is described by Freeny, "Special-purpose hardware for digital filtering", Proc. IEEE, vol. 63, No. 4, (1975) pages 633–648.

The invention will now be explained in detail with the aid of an m-PSK modem where m=8. In such a system, the m=8 desired phase points in the phase plane are arranged at equal distances, so that the angle spacing is $360°/8=45°$. The decider 14 of FIG. 1 emits values corresponding to one of these phase points per step and these values are used as the basis for the future setting of the phase regulation and of the adaptive equalizer. Due to special circumstances, e.g. starting conditions, interference or malfunctions, it can happen that individual values are summed in the integral branch 24 in such a way that the phase regulation from step to step shifts in phase by $i\cdot 360°/m = i\cdot 45°$, where i is an integer, without this phase shift corresponding to an actually existing frequency displacement between the modem transmitter and receiver. This leads to error decisions which generally can be detected in the system only upon checking of the received data sequence.

The above-described undesirable state will not be reached if the output value of the integral branch 24 is limited by the non-linear limiter 40 such that the phase can be shifted per step only by a maximum value of $360°/2m=22.5°$ for the 8-PSK system.

Alternatively, the limitation of the phase regulation value $\delta k$ can be realized with the aid of an overflow readout 42 as shown in FIG. 2. Such overflow readout becomes less complicated if, as shown, instead of inserting the weighting factor ki by means of single multiplier (e.g. multiplier 36 of FIG. 1), the weighting factor ki is divided into the product of two partial factors $k_1$ and $k_2$, which are associated with respective multipliers 36' and 44. The realization becomes particularly simple if the weighting factor ki or at least one of the two partial factors $k_1$ or $k_2$ is equal to $2^{-i}$, where i=a whole number. The mode of operation of such an overflow readout is described by Freeny, "Special-purpose Hardware for Digital Filtering", Proc. IEEE, vol. 63, No. 4 (1975) pages 633–648.

It is to be understood that the above description of the present invention is susceptible to various modifications, changes and adaptations, and the same are intended to be comprehended within the meaning and range of equivalents of the appended claims.

The embodiments of the invention in which an exclusive property or privilege is claimed are defined as follows:

1. In a method for digitally regulating the carrier phase error in receivers of digital data transmission systems including the steps of: feeding sampled data values of the carrier demodulated input signal of the receiver to a decider to provide estimated values for each associated sampling time; comparing the sampled value of the demodulated input signal with the associated estimated value for each sampling time to determine a deviation value which is a measure for the phase difference between said sampled value said associated estimated value; filtering said deviation value in a digital loop filter including parallelly connected proportional and integral circuit branches; accumulating the output values of said digital loop filter to provide a regulating value; and using said regulating value to correct the carrier phase error of the demodulated input signal; the improvement comprising including a non-linear limit on the said deviation value being integrated over time in said integral branch of said digital loop filter.

2. A method as defined in claim 1 wherein said step of including a non-linear limit includes limiting all deviations $|B|>a$ to the deviation limit value $|B|\leq a$, where B=said deviation value, $a=360°/2m$, and m is the number of desired phase positions of said carrier.

3. A method as defined in claim 1 or 2 wherein the said step of including a non-linear limit occurs only after the end of a data transmission preamble.

4. The method defined in claim 2 wherein the input signal to the data transmission system is an m-PSK system.

5. The method defined in claim 1 wherein the input signal to the data transmission system is an m-PSK system.

6. Apparatus for digitially regulating the residual carrier phase error in a receiver of a digital data transmission system comprising in combination:

first circuit means for providing output signals corresponding to sampled values of a carrier demodulated input signal to a receiver;

second circuit means, connected to the output of said first circuit means and responsive to a regulating signal, for regulating the phase of the output signals from said first circuit means;

decider means, having its input connected to the output of said second circuit means and responsive to said sampled values, for providing an estimated value for each associated sampling time; and, a control circuit for providing said regulating signal for said second circuit means, said control circuit including a comparator means for comparing the input and output values of said decider means and for providing a deviation value, which is a measure of the phase difference between associated sampled and estimated values, at its output, a digital loop filter having its input connected to said output of said comparator means, and an accumulator means, connected between the output of said digital loop filter and a regulating input of said second circuit means, for accumulating the output values of said digital loop filter to provide said regulating signal, said digital loop filter including an integration branch circuit and a proportional branch circuit each having one end connected to said input of said digital loop filter and its other end connected to one input of a summing member for combining the signals in said branches, and a multiplier means, connected between the output of said summing member and the input of said accumulator means, for weighting the output value from said summing member with a desired value; and said integration branch circuit including the series connection of means for multiplying said deviation value by a desired value to weight same, means for non-linearly limiting the deviation value in said integration branch to a desired value, and a feedback coupled delay means.

7. Apparatus as defined in claim 6 wherein the data transmission system is an m-PSK system.

8. A circuit arrangement as defined in claim 6 wherein said means for non-linearly limiting limits the said deviation value so that it is no greater than one-half of the angle spacing in the phase plane of the desired phase positions of the data.

9. Apparatus as defined in claim 8 wherein the data transmission system is an m-PSK system.

* * * * *